United States Patent [19]

Shackle et al.

[11] Patent Number: 6,051,339
[45] Date of Patent: Apr. 18, 2000

[54] LITHIATED POLYVANADATE CATHODES AND BATTERIES CONTAINING SUCH CATHODES

[75] Inventors: Dale R. Shackle; Benjamin Chaloner-Gill, both of Santa Clara, Calif.

[73] Assignee: Rentech, Inc., San Jose, Calif.

[21] Appl. No.: 09/084,807

[22] Filed: May 26, 1998

[51] Int. Cl.[7] .............................. H01M 4/50; H01M 4/58; C01G 31/00; C01G 45/00; C01B 25/00
[52] U.S. Cl. ....................... 429/231.2; 429/224; 423/593; 423/599; 423/306
[58] Field of Search ..................... 423/593, 599, 423/306, 179.5; 429/224, 231.2, 231.5

[56] References Cited

U.S. PATENT DOCUMENTS

| | | | |
|---|---|---|---|
| 4,228,226 | 10/1980 | Christian et al. | 429/194 |
| 4,303,748 | 12/1981 | Armand et al. | 429/192 |
| 4,416,915 | 11/1983 | Palmer et al. | 427/126.3 |
| 4,547,440 | 10/1985 | Hooper et al. | 429/112 |
| 4,560,632 | 12/1985 | Alberto | 429/196 |
| 4,589,197 | 5/1986 | North | 29/623.1 |
| 4,751,157 | 6/1988 | Uchiyama et al. | 429/194 |
| 4,751,158 | 6/1988 | Uchiyama et al. | 429/194 |
| 4,879,190 | 11/1989 | Lundsgaard | 429/94 |
| 4,925,751 | 5/1990 | Shackle et al. | 429/191 |
| 4,925,752 | 5/1990 | Fauteux et al. | 429/191 |
| 4,935,317 | 6/1990 | Fauteux et al. | 429/192 |
| 5,011,501 | 4/1991 | Shackle et al. | 29/623.1 |
| 5,326,653 | 7/1994 | Chang | 429/162 |
| 5,576,120 | 11/1996 | Saidi | 429/218 |
| 5,616,437 | 4/1997 | Gao | 429/245 |
| 5,620,811 | 4/1997 | Zhang | 429/192 |
| 5,622,793 | 4/1997 | Iijima et al. | 429/218 |
| 5,648,187 | 7/1997 | Skotheim | 429/213 |
| 5,660,948 | 8/1997 | Barker | 429/194 |
| 5,670,277 | 9/1997 | Barker et al. | 429/220 |
| 5,672,446 | 9/1997 | Barker et al. | 429/218 |
| 5,690,703 | 11/1997 | Mitchell et al. | 29/623.5 |
| 5,700,298 | 12/1997 | Shi et al. | 429/232 |
| 5,759,215 | 6/1998 | Masuda | 429/192 |

FOREIGN PATENT DOCUMENTS 0145498   6/1985   European Pat. Off. .

OTHER PUBLICATIONS

Howard T. Evans, Jr., Molecular Structure of the Isopoly complex Ion, Decavanadate $(V_{10}O_{28}^{6-})^1$, *Inorganic Chemistry*, vol. 5, No. 6, pp. 967–977 (1966).

A. G. Swallow, et al., The Crystal Structure of Pascoite, $Ca_3V_{10}O_{28} \cdot 17H_2O$, *Acta Cryst.*, 21, pp. 397–405 (1966).

Kenji Nomiya, et al., Structural Stability Index of Heteropoly—and Isopoly—Anions—II, *Tebrahedron*, vol. 4, No. 1, pp. 89–95 (1985).

C.M. Flynn, Jr., et al., 1:13 Heteropolyvanadates of Manganes (IV) and Nickel (IV)[1], *JACS*, 92:1, pp 85–90 (1970).

The Chemical Society of Japan, *Chemistry Letters*, pp 1267–1270, (1986).

C.M. Flynn, Jr. et al., Heteropolyvanadomanganates (IV) with Mn:V=1:11 and 1:4, *Inorganic Chemistry*, vol. 9, No. 9, pp 2009–2014 (1970).

*Primary Examiner*—Steven Bos
*Attorney, Agent, or Firm*—Thompson Hine & Flory LLP

[57] ABSTRACT

A cathode for use in an electrochemical cell comprising a lithiated isopolyvanadate or heteropolyvanadate wherein the isopolyvanadate or heteropolyvanate has a cage structure, and an electrochemical battery comprising an alkali metal anode, an ionically conductive electrolyte and a cathode which comprises a lithiated isopolyvanadate or heteropolyvanadate having a cage structure, are described.

19 Claims, 11 Drawing Sheets

LITHIATED POLYVANADATE CATHODES AND BATTERIES CONTAINING SUCH CATHODES

BACKGROUND OF THE INVENTION

This invention relates to electrochemical battery cells and, in particular, the manufacture of a lithiated cathode for use in such electrochemical battery cells wherein the cathode is manufactured from a lithiated vanadium complex having a cage structure.

The demand for improved energy storage devices such as electrochemical batteries has increased steadily. The recent trend towards smaller and lighter electronic devices has precipitated the demand for portable electronic equipment, where expense, durability, reliability and high energy density are critical.

Non-aqueous lithium electrochemical cells typically include an anode, an electrolyte prepared from a lithium salt dissolved in one or more organic solvents and a cathode of an electrochemically active material, typically a chalcogenide of a transition metal. During discharge, lithium ions from the anode pass through the electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

U.S. Pat. Nos. 4,751,157 and 4,751,158 to Uchiyama et al. disclose cathode materials for use in lithium electrochemical cells. The cathode material comprises a mixed metal oxide as an active material, along with a conductive diluent and a binder which is pressed into electrodes on a nickel screen and sintered under vacuum. The cathode materials are used in cells which contain a liquid electrolyte, and more particularly, those which contain $LiAsF_6$ in an aprotic solvent, such as methyl formate.

U.S. Pat. No. 4,416,915 to Palmer et al. discloses a chalcogenide cathode made by applying a slurry of a mixture containing at least one intercalatable layered transition metal chalcogenide, a conductivity enhancing agent and a binding agent in a vehicle, to a high porosity current collector substrate. The cathode material is utilized in a non-aqueous lithium cell having an electrolyte comprising an electrolyte-solvent mixture.

U.S. Pat No. 4,560,632 to Alberto discloses a molded porous cathode collector for use in non-aqueous cells. The collector includes a particulate carbonaceous conductive material bonded with a suitable binder, and having on its surface a coating of a vinyl polymer film to improve its mechanical strength and handling characteristics. The cathode collector is used in association with liquid cathode materials.

Solid state rechargeable electrochemical cells constructed of an alkali metal foil anode, such as lithium foil, an ionically conducting polymeric electrolyte and a composite cathode containing a finely divided transition metal oxide are described extensively in the patent literature. See, for example U.S. Pat. No. 4,303,748 to Armand; U.S. Pat. No. 4,589,197 to North; U.S. Pat. No. 4,547,440 to Hooper et al; and U.S. Pat. No. 4,228,226 to Christian. U.S. Pat. No. 5,690,703 to Mitchell et al., discloses a carbon anode such as coke or graphite intercalated with lithium ions.

As discussed by Uchiyama et al., supra, rechargeable batteries employing lithium systems offer the potential for both high energy and light weight. While lithium intercalating transition metal oxides are attractive because of their tendency to possess high energy content, the known oxides are either expensive to prepare as in the case of vanadium oxides or they are electronic insulators thereby preventing their use for high battery current applications. Another difficulty with transition metal oxides, especially $V_2O_5$, is susceptibility to over-discharge which results in structural rearrangement and severe losses in cell capacity.

Accordingly, there exists a need for an improved cathode possessing high ionic and electronic conductivity as well as good mechanical strength and improved recharge ability for use in electrochemical batteries.

SUMMARY OF THE INVENTION

According to the present invention a cathode is provided for use in an electrochemical cell comprising a lithiated isopolyvanadate or heteropolyvanadate, wherein said isopolyvanadate or heteropolyvanadate has a cage structure.

The invention also provides an electrochemical battery comprising
an alkali metal anode;
an ionically conductive electrolyte; and
a cathode, the cathode comprising a lithiated isopolyvanadate or heteropolyvanadate wherein the isopolyvanadate or heteropolyvanadate has a cage structure. The cage structure of the isopolyvanadate and the heteropolyvanadate of the present invention are considerably more amenable to the insertion of lithium atoms than are the prior art vanadium compounds having layered or channeled structures.

DETAILED DESCRIPTION OF THE INVENTION

Figure 1:
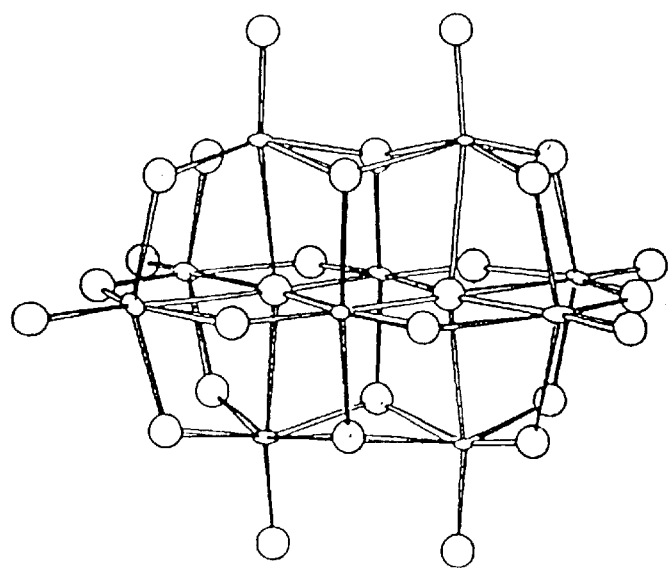
FIG. 1 is an illustration of the cage structure for the compound $[V_{10}O_{28}]^{-6}$ of Example 1.
Figure 2:
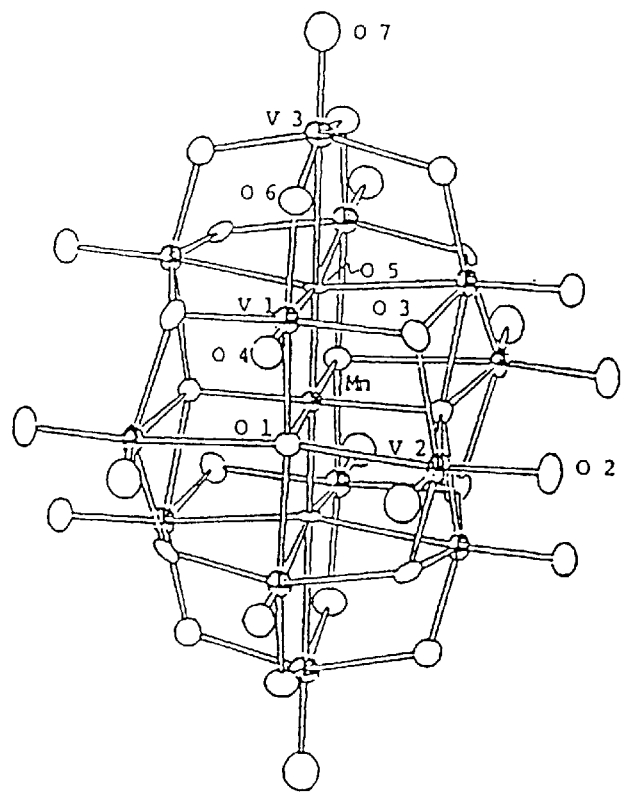
FIG. 2 is an illustration of the cage structure for $[MnV_{13}O_{38}]^{-7}$ of example 2.

In accordance with the invention, a cathode is provided which comprises a lithiated vanadium oxide in which the vanadium oxide has a cage structure. The vanadium oxide cage may be an isopolyvanadate or heteropolyvanadate, i.e., the cage structure may contain only vanadium and oxygen atoms or it may also contain other metallic and non-metallic atoms such as manganese, phosphorous and the like. Such vanadium oxide materials found to be effective in the present invention include $Li_6V_{10}O_{28}$ $xH_2O$, $Li_7V_{13}O_{38}$ $xH_2O$, $Li_{12}PV_{13}O_{41}$, $Li_8V_9O_{19}$, $Li_6V_{10}O_{28}$, $Li_3MnV_9O_{26}$, $Li_4Mn V_{10}O_{29}$, $Li_5 MnV_{11}O_{32}$, $Li_6MnV_{12}O_{35}$ and $Li_7MnV_{12}O_{35}$ and $Li_7MnV_{13}O_{38}$. Mixtures of one or more of these lithiated oxides with other metal oxides or lithiated metal oxides may also be used in carrying out the present invention.

In describing the preferred embodiments of this invention, certain terminology will be utilized for the sake of clarity. It is intended that this terminology cover not only the recited embodiments, but all technical equivalents which operate in the same manner, for the same purpose to achieve the same result. The term "cage structure" as used herein means a system of bonds connecting each atom in the compound to its neighbor in a polyhedron and is to be distinguished from the layered or channeled structure of conventional vanadium oxides. These lithiated vanadium oxide cage structures provide an inexpensive, high energy cathode material with excellent cycle-life and rate capabilities when used in a lithium electrochemical cell.

The term "electrochemical cell" refers to a composite structure containing an anode, a cathode, and an ion-conducting electrolyte interposed therebetween.

The term "battery" refers to two or more electrochemical cells electrically interconnected to provide appropriate voltage and current levels.

The term "solid polymeric matrix" refers to an electrolyte-compatible material formed by polymerizing an inorganic or organic monomer and which when used in combination with the other components of the electrolyte, renders the electrolyte solid. Suitable solid polymeric matrices are well known in the art. See, for example, U.S. Pat. No. 4,925,751.

The term "salt" refers to any salt, for example, an inorganic salt, which is suitable for use in a non-aqueous electrolyte. Representative examples of suitable inorganic salts are alkali metal salts of less mobile anions of weak bases having a large anionic radius. Examples of such anions are $I^-$, $Br^{31}$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Mg and K.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, aprotic, relatively polar solvent.

The cathode is typically coated or laminated on one or both surfaces and in the voids of a collector material. This provides a greater amount of electrical contact area between the electrically conductive material of the cathode composition and the current collector substrate. In one manifestation, the compatible cathodic material can be mixed with a polymeric binder to form a positive cathodic plate. Suitable binders for use in the cathode have a molecular weight of from about 1,000 to 5,000,000. Preferably, the cathode is prepared from a cathode paste which comprises a litiated vanadium oxide cage structure material; an electroconductive agent such as carbon black or graphite; a suitable polymeric binder that may include ethylene-propylene-diene termonomer (EPDM), polyvinylidene difluoride (PVDF), ethylene-acrylic acid copolymer (EAA), ethylene-vinyl acetate copolymer (EVA), EAA/EVA copolymer mixtures, and the like; and a volatile solvent such as acetone or THF (tetrahydrofuran). Typically, these components are present in an amount of about 50 to 75% vanadium oxide, about 1 to 30% electroconductive agent, and about 1 to 20% binder. The active cathode material preferably has a particle size of less than 1 micron but can range up to about 20 microns, e.g., about 0.5 to about 20 microns.

The solid polymeric matrix can be formed by a casting process which does not require the use of monomers or prepolymers, that is, no curing is required. A preferred method employs a copolymer of polyvinylidenedifluoride and hexafluoropropylene dissolved in acetone or other suitable solvent(s). Upon casting the solution the solvent is evaporated to form the solid polymeric matrix. The solution may be cast directly onto a current collector. Alternatively, the solution may be cast onto a substrate, such as a carrier web, and after the solvent (e.g., acetone) is removed, an electrode film is formed thereon.

The alkali metal anode layer may take the form of a lithium foil, a lithium coated foil such as nickel or copper foil having a layer of lithium deposited on its surface or a lithium alloy. Also useful in the invention are carbon anodes, e.g., coke and graphite intercalated with lithium ions such as those described in U.S. Pat. No. 5,690,703 to Mitchell et al., the contents of which are incorporated herein by reference.

The anode and cathode each also preferably includes a current collector that comprises, for example, a screen, grid, expanded metal, woven or non-woven fabric formed from an electron conductive material such as metals or alloys. Each current collector is also connected to a current collector tab which extends from the edge of the current collector. In batteries comprising multiple electrochemical cells, the anode tabs are preferably welded together and connected to a copper or nickel lead. The cathode tabs are similarly welded and connected to a lead. External loads can be electrically connected to the leads. Current collectors and tabs are described in U.S. Pat. Nos. 4,925,752, 5,011,501, and 5,326,653.

Useful collector substrates having a plurality of surface voids include carbon, copper, aluminum, nickel, steel, lead and iron materials, or combinations thereof, in the following configurations: foamed nickel or similar foamed metals; foamed glass that has been plated with an inert or noble metal to increase surface conductivity; foamed polymers containing a surface or bulk conductivity agent; foamed Ti-, Nb-, Zr-, W-, Ta-carbides; foamed molybdenum disilicide; reduced metal reacted molecular or carbo sieves; chemically etched metal foils; electrodeposited films; carbon, graphite or vitreous carbon fiber or fibril laminates of ultra high surface area. Foamed metals in the form of a mesh or grid and chemically etched metal foils are preferred substrates. The thickness of the current collector should be as thin as practical and preferably is about 5 to 25 microns.

The electrolyte contains an inorganic ion salt such as an alkalii metal salt. The electrolyte may be in the form of a solid material which is laminated to the alkali metal anode layer and the cathode/current collector layer or the electrolyte layer may be in the form of a liquid, wherein the inorganic ion salt is dissolved in a low molecular weight solvent. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate-based elecrolytes in an electrolytic cell with graphite anodes, a sequestering agent, such as a crown ether, is added in the electrolyte. When in the form of a liquid, the electrolyte requires the use of a separator between the cathode and the anode. Typically, the separator is a non-conductive polymeric film such as CELGARD 3500, a polypropylene separator manufactured by Hoechst Celanese, Dallas, Tex. The use of a separator is not required with a solid electrolyte material. The electrolyte composition typically comprises about 5 to 25 weight percent of the inorganic ion salt based on the total weight of the electrolyte; preferably, about 10 to 20 weight percent; and even more preferably from about 10 to 15 weight percent. The percentage of salt depends on the type of salt and electrolytic solvent employed. Where the electrolyte composition comprises a liquid, it typically contains from 0 to about 80 weight percent electrolyte solvent (e.g., organic carbonate/glyme mixture) based on the total weight of the electrolyte; preferably from about 60 to 80 weight percent; and even more preferably about 70 weight percent. Additionally, the electrolyte composition typically comprises from about 5 to about 30 weight percent of the solid polymeric matrix based on the total weight of the electrolyte; preferably from about 15 to 25 weight percent.

Also useful as electrolytes are solid solutions of an ionizable alkali metal salt or an alkaline earth salt in an ionically conductive polymer such as solid solutions of an alkali metal salt, an ionically conductive polymer and a plasticizer. General examples of useful ionically conductive polymers are described in U.S. Pat. No. 4,303,748 to Armand and European Application 0 145 498 to Cook. These polymers have repeating units containing at least one heteroatom such as an oxygen or nitrogen atom. They can be represented as polymers having the repeating unit:

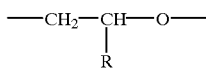

wherein R is hydrogen or a group $R_a$, $-CH_2OR_a$, $-CH_2OR_eR_a$, $-CH_2N(CH_3)_2$, in which $R_a$ is an alkyl group containing 1 to 16 carbon atoms and preferably 1 to 4 carbon atoms or a cycloalkyl group containing 5 to 8 carbon atoms, and $R_e$ is an ether group of formula $-CH_2-CH_2O_p-$ wherein p is a number from 1 to 100, preferably 1 or 2; or having the repeating unit:

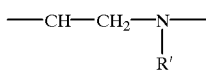

wherein R' is $R_a$, or $R_eR_a$, as defined above; or having the repeating unit:

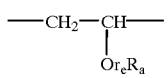

wherein $R_e$ and $R_a$ are as defined above. Copolymers of the above polymers may also be useful.

It has been found particularly desirable to prepare these electrolytes using a radiation curable composition which includes a monomer of the formulae:

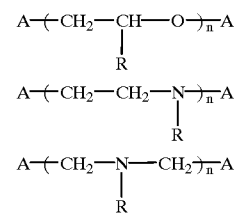

where n is about 3 to 50 and R is hydrogen or a $C_1$–$C_3$ alkyl group which are terminated by ethylenically unsaturated moieties or glycidyl moieties represented by A. A particularly useful group of compounds is obtained by reacting a polyethylene glycol with acrylic or methacrylic acid. Polyethylene glycol diacrylate is a particularly preferred polymer. To provide additional structural integrity, triacrylate prepolymers may be added.

In addition to providing a matrix for containing the alkali metal salt, the ionically conductive polymer additionally functions as a binder material to enable the cathode composition to adhere to the collector substrate. Because of its adhesive qualities, acrylated polyethylene oxide is the preferred ionically conductive polymer. For use as an additional adhesive, acrylated polyesters may be selected. Preferably, the ionically conductive polymeric materials have a molecular weight of about 200 to 800. Still more preferably they are liquids at temperatures less than 30° C.

In a preferred embodiment, the electrolyte composition comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in a mount of about 1 to 10 weight percent and more preferably at about 2.5 weight based on the total weight of the electrolyte composition.

To produce a solid electrolyte material, the solid solution of the ionizable salt and polymer can be mixed with a curable electrolyte composition and the mixture is cured by exposure to actinic radiation, preferably electron beam or ultraviolet radiation. If ultraviolet radiation is used for curing, an ultraviolet photoiniator may be added to the composition.

The completed cell may be manufactured utilizing any of a number of different methods. For example once each of the anode layer, electrolyte layer and cathode/current collector layer are manufactured, they may be laminated together to form a solid state cell. Lamination typically occurs by the application of heat and pressure.

Alternatively, however, the electrochemical device can be assembled "wet" and then cured in situ. For example, a lithium coated foil member can be coated with the radiation polymerizable electrolyte composition and overcoated with the cathode coating composition/current collector substrate. These structures can be cured by exposure to electron beam or another source of actinic radiation.

Thus, in one aspect of the invention, the current collector substrate may be coated with a polymerizable cathode composition. This structure is overcoated with a layer of the polymerizable electrolyte composition described above and assembled with an anodic member such as a lithium foil member or a lithium coated nickel or aluminum member. This assembly may be cured by exposure to electron beam to provide an electrochemical cell. The cured electrolyte and cathode compositions adhere to one another as well as to the metal members associated with the anode and cathode.

In another aspect of the invention, the layers can be reversed. An anodic metal foil member such as lithium coated metal foil can be coated with the polymerizable electrolyte composition described above. A polymerizable cathode composition is coated over the current collector and is assembled with the anode and electrolyte layers. The assembly is subjected to electron beam radiation to produce an electrochemical cell in accordance with the present invention.

In yet another aspect of the invention, the anodic foil member or the current collector substrate may be coated with the appropriate cathode or electrolyte composition and that composition may be cured (e.g., by exposure to radiation when it is radiation curable). The cured composition may be overcoated with the other of the electrolyte or cathode composition thereafter, and the overcoating may be cured or the remaining anodic foil member or current collector substrate may be laminated and then the overcoating cured.

The invention is illustrated in more detail by the following non-limiting example(s).

EXAMPLE 1
Preparation of $Li_6V_{10}O_{28}\cdot XH_2O$ 9.10 g of $V_2O_5$ was mixed with 4.52 g of $LiOH\cdot H_2O$ in 200 ml of water until solution was complete. Concentrated acetic acid was added to the solution to adjust the pH to 5.0. The solution was then allowed to evaporate at room temperature to a final volume of approximately 75 ml. The solution was then added to 700 ml of diglyme. A red-orange oil separated from the solution. The solution was decanted from the oil. The oil was then washed with tetrahydrofuran (THF). An orange solid resulted from this treatment. The solid was filtered from the liquid and washed with tetrahydrofuran. The solid was then dried at 170° C. A green brown solid resulted from the drying process.

The resulting solid was ground in a ball mill to reduce the particle size. The material was then incorporated into a coating formulation with the following composition.

Test material 76%

Acetylene black carbon 14%

Kynar 2801 (a vinylidene fluoride resin) 10%

Figure 3:
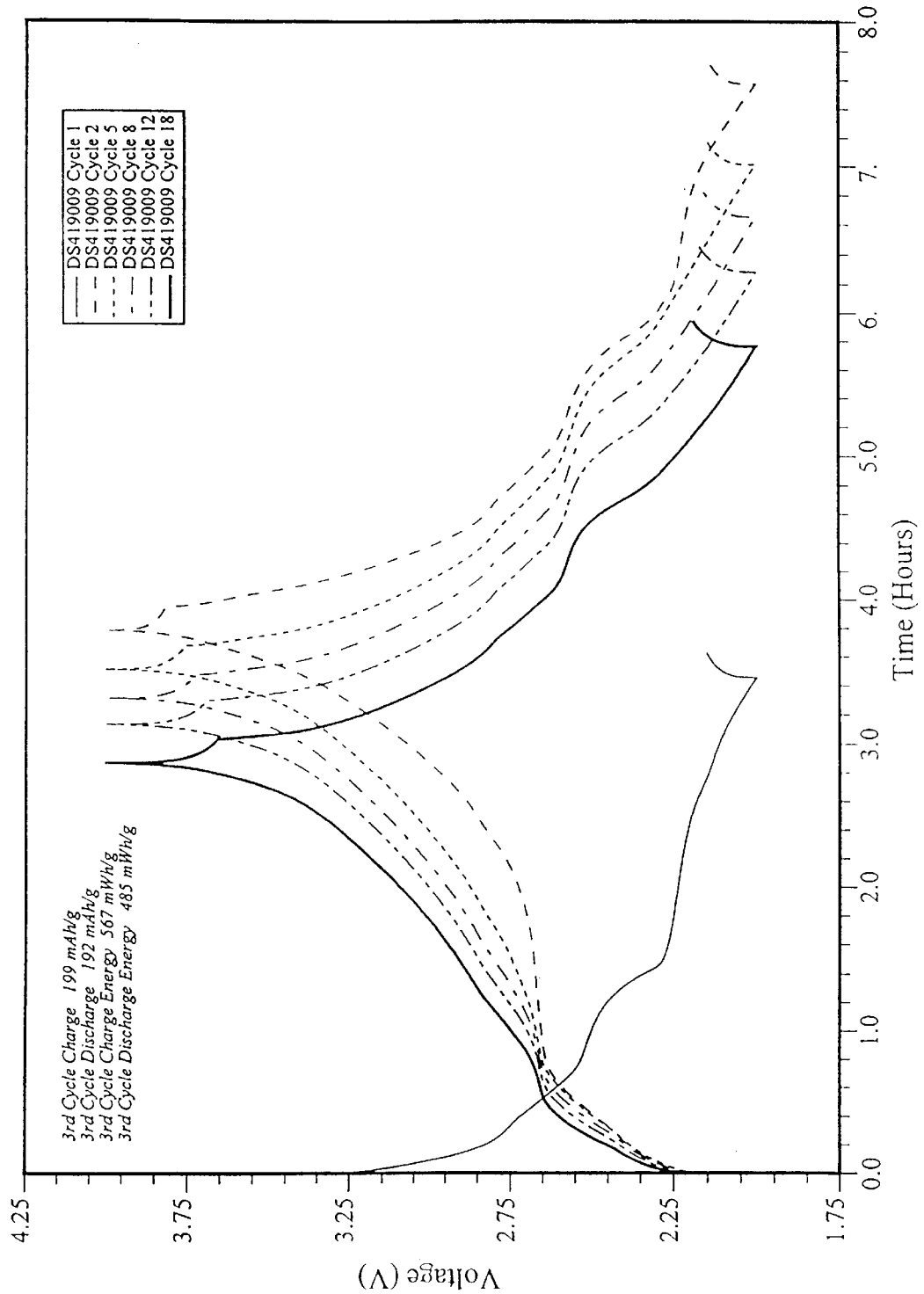
FIG. 3 shows the charge/discharge cycles for the battery of Example 1.

This formulation is then coated from an acetone solution onto an aluminum foil substrate. A test battery was then constructed using a 2 cm² piece of the above coating as a cathode, a polypropylene separator (Celgard 3500), and lithium metal as the anode. The electrolyte consisted of a 1M $LiPF_6$ in 50/50 volume % solution ethylene carbonate and dimethyl carbonate. The test battery was then repeatedly charged and discharged using a current of 0.25 mA. The test results are shown in FIG. 3.

EXAMPLE 2
Preparation of $Li_7V_{13}O_{38}\cdot XH_2O$ $(NH_4)_7(MnV_{13}O_{38})18H_2O$ was prepared as disclosed in *Inorganic Syntheses* page 107. 15.2 g of ammonium metavanadate was dissolved in 500 ml of 80° C. water. 10 ml of 0.5M $H_2SO_4$ was added to the yellow solution. The color of the solution changes to orange after the addition of the acid. 1.69 g of $MnSO_4\cdot H_2O$ was then added to the solution. After solution was complete, 4.56 g of ammonium peroxydisulfate was added to the solution. The temperature was maintained at 80° C. for 6 hours. During this time the color changed to a dark brown. The solution was filtered and the solid was discarded. To the filtrate was added 1.54 g of ammonium acetate. The solution was allowed to evaporate at room temperature for six days. Red-orange crystals form during this time. They were collected by filtration and washed with cold water.

Five grams of the above material was dissolved in 25 ml of water and then passed through a cation exchange resin to replace the ammonium ions with lithium ions. The solution obtained from this process was evaporated to dryness. The resulting material was then dried at 100° C.

Figure 4:
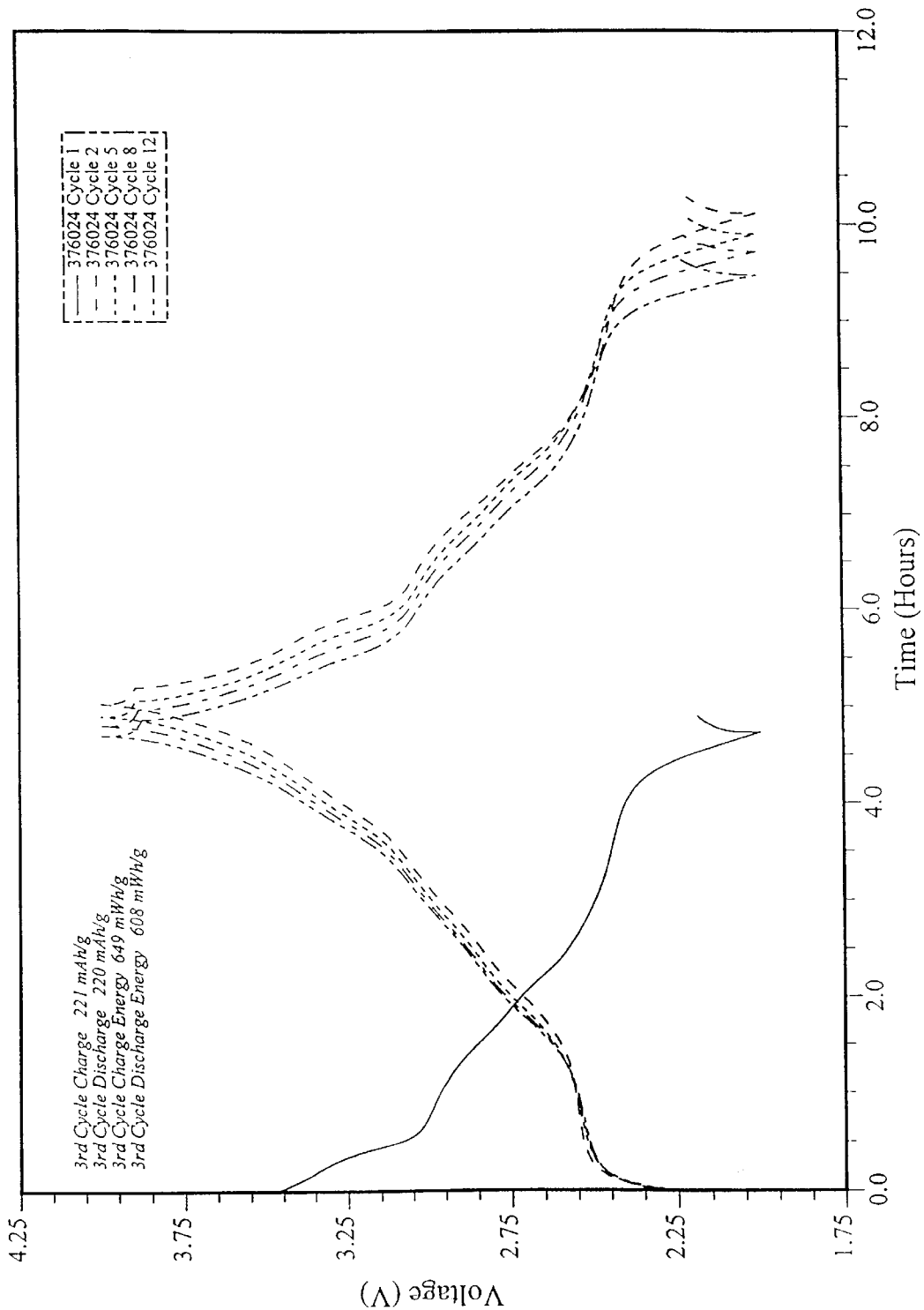
FIG. 4 shows the charge/discharge cycles for the battery of Example 2.

Test batteries were prepared as described in Example 1. The test results are shown in FIG. 4.

EXAMPLE 3
Preparation of $Li_{12}(PV_{13}O_{41})$ 1.15 g of 85% $H_3PO_4$, 12.74 g $V_2O_5$ and 6.72 g $LiOH\cdot H_2O$ were added to 100 ml of water. The pH was adjusted to 5.0 with concentrated $H_2SO_4$. A dark brown solution formed after the pH adjustment. The solution was allowed to stand in an evaporating a room temperature until crystals formed. The crystals were collected by filtration and washed with cold water. The crystals were dried at 150° C.

Figure 5:
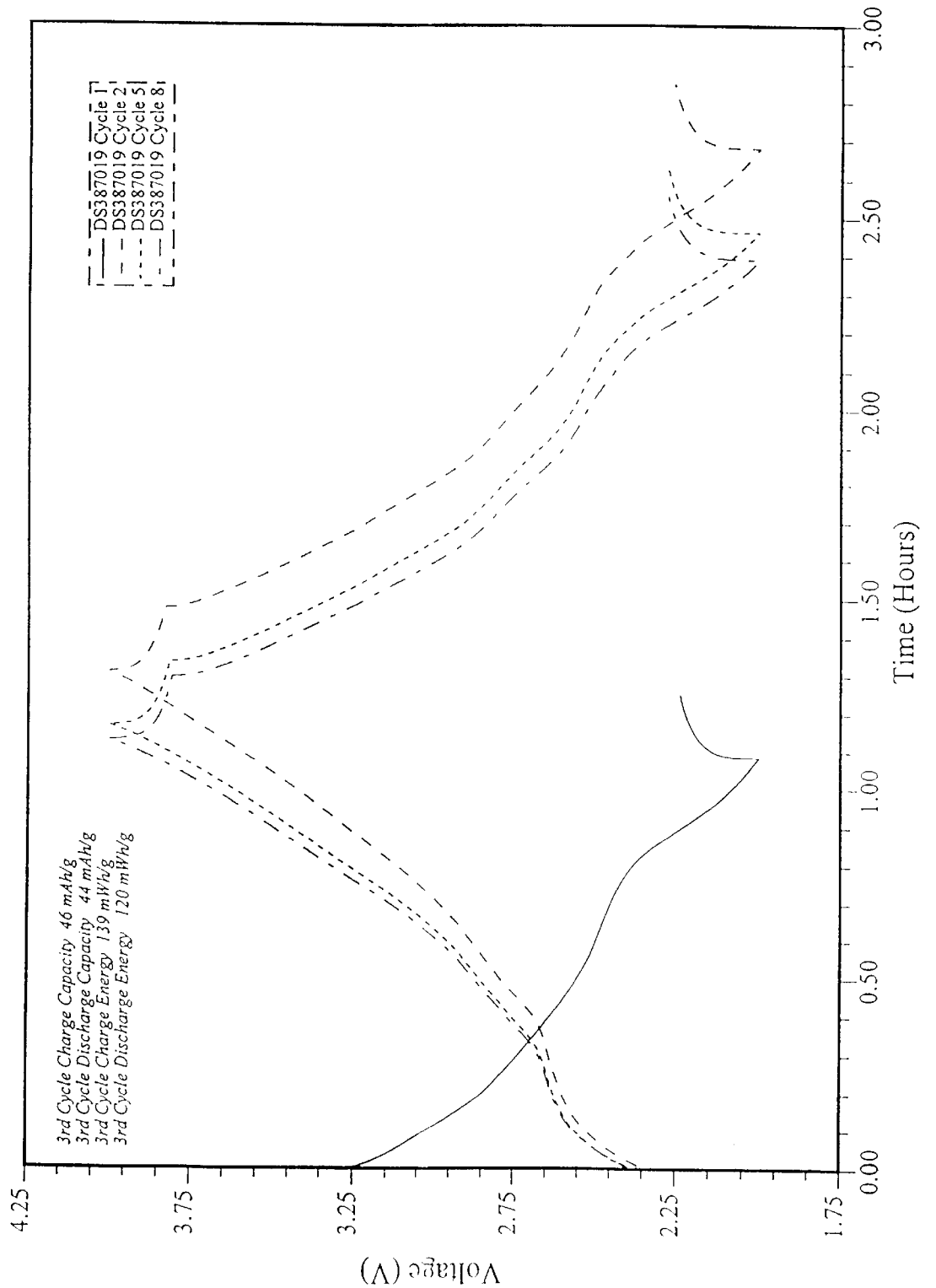
FIG. 5 shows the charge/discharge cycles for the battery of Example 3.

Test batteries were prepared as described in Example 1. Test results are shown in FIG. 5.

EXAMPLE 4
Preparation of $Li_8V_6O_{19}$ 7.46 $V_2O_5$ and 4.23 g $Li_2CO_3$ were ground in a mortar and pestle and then placed in a furnace at 400° C. in air for 62 hours. A white solid reaction product formed.

Figure 6:
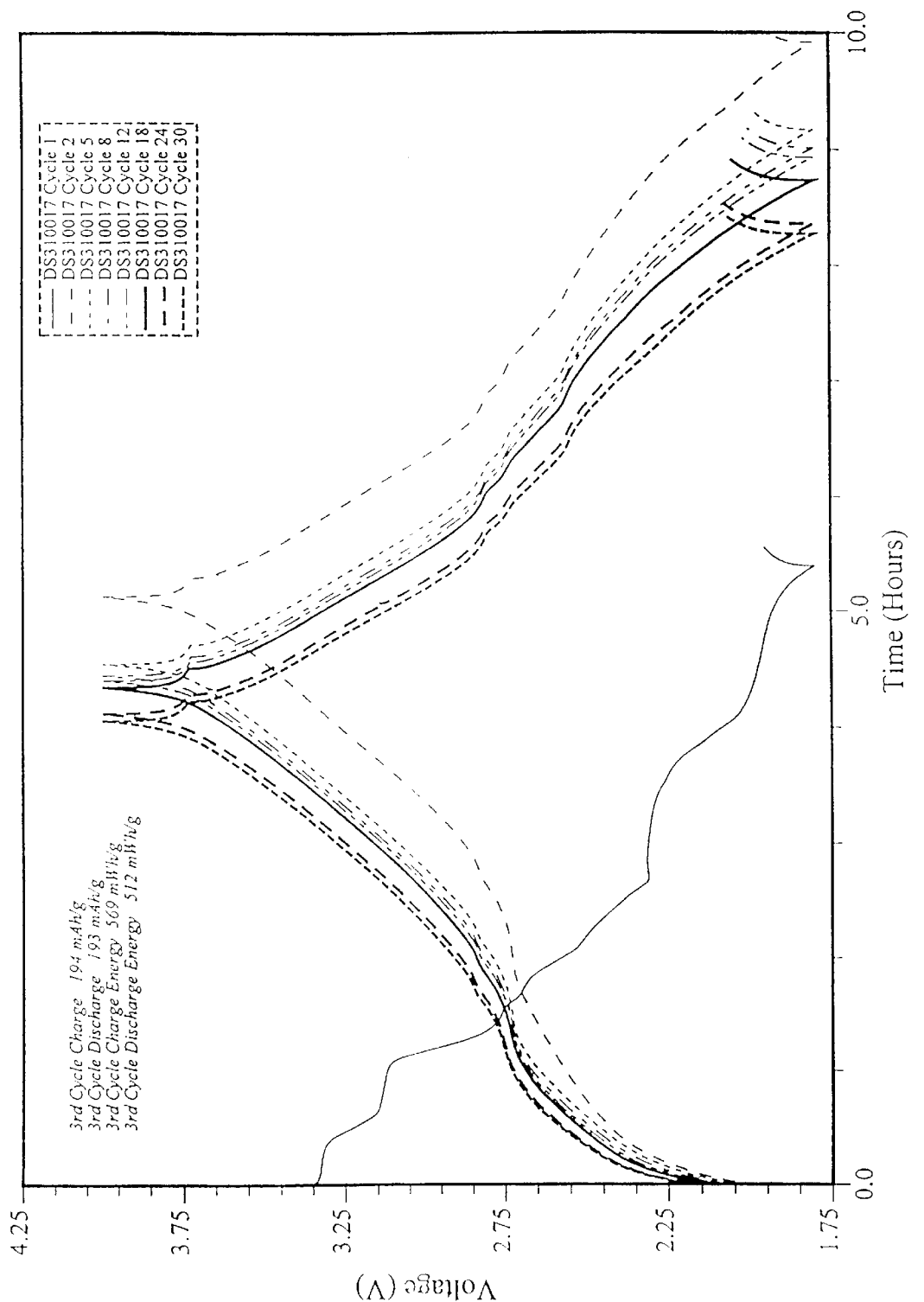
FIG. 6 shows the charge/discharge cycles for the battery of Example 4.

Test batteries were prepared as described in Example 1. Test results are shown in FIG. 6.

EXAMPLE 5
Preparation of $Li_6V_{10}O_{28}$ 6.36 g of $LiVO_3$ and 3.48 g of $V_2O_5$ were ground together in a mortar and pestle and then placed in an oven at 400° C. in air for 70 hours. A red reaction product resulted.

Figure 7:
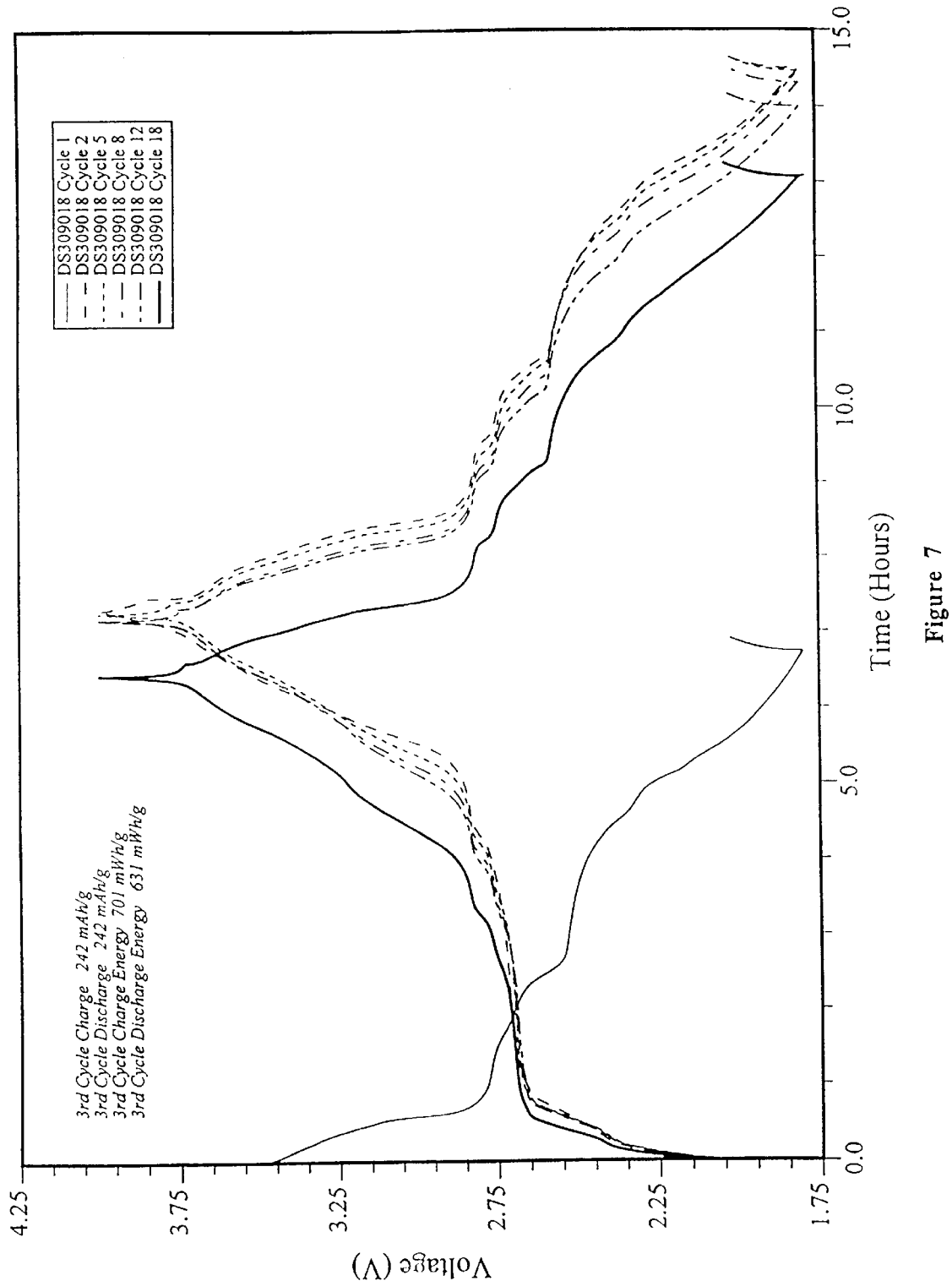
FIG. 7 shows the charge/discharge cycles for the battery of Example 5.

Test batteries were prepared as described in Example 1. Test results are shown in FIG. 7.

EXAMPLE 6
Preparation of $Li_3MnV_9O_{26}$

The following materials were ground in a mortar: 8.00 g $V_2O_5$ (0.044 mol), 1.14 g $Li_2MnO_3$ (0.0098 mol) and 0.36 g $Li_2CO_3$ (0.0049 mol). After grinding, the mixture was transferred into an alumina crucible (Coors) and heated in air @ 600° C. overnight. After cooling, the crucible was placed in a water filled beaker and left to soak overnight. The material was scraped out of the crucible and filtered, washed with water, dried and finally reground.

Figure 8:
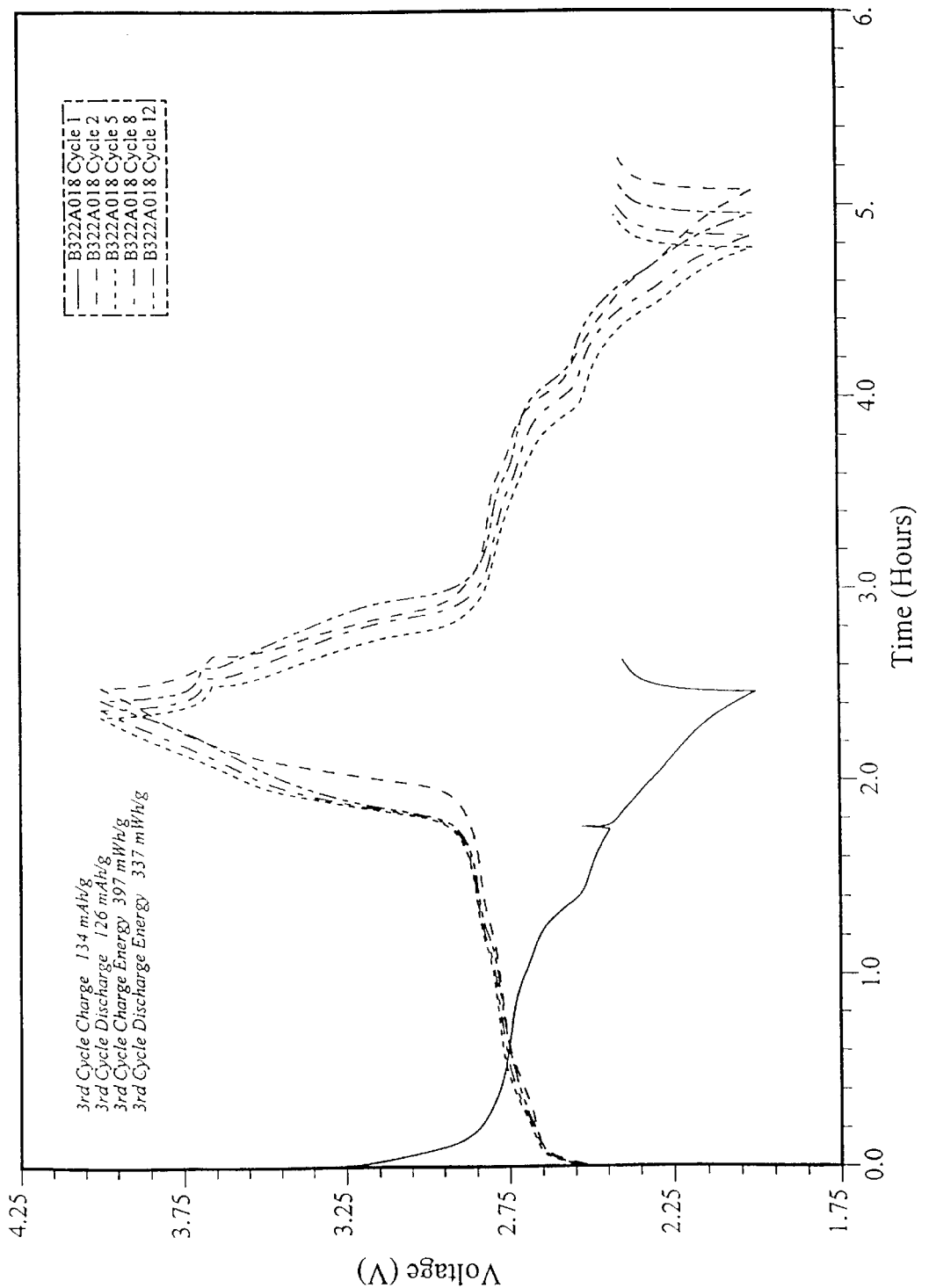
FIG. 8 shows the charge/discharge cycles for the battery of Example 6.

Test batteries were prepared as described in Example 1. Test results are shown in FIG. 8.

EXAMPLE 7
Preparation of $Li_4MnV_{10}O_{29}$

The following materials were ground in a mortar: 8.00 g $V_2O_5$ (0.044 mol), 1.03 g $Li_2MnO_3$ (0.0088 mol) and 0.65 g $Li_2CO_3$ (0.0088 mol). After grinding, the mixture was transferred into an alumina crucible (Coors) and heated in air @ 600° C. overnight. After cooling, the crucible was placed in a water filled beaker and left to soak overnight. The material was scraped out of the crucible and filtered, washed with water, dried and finally reground.

Figure 9:
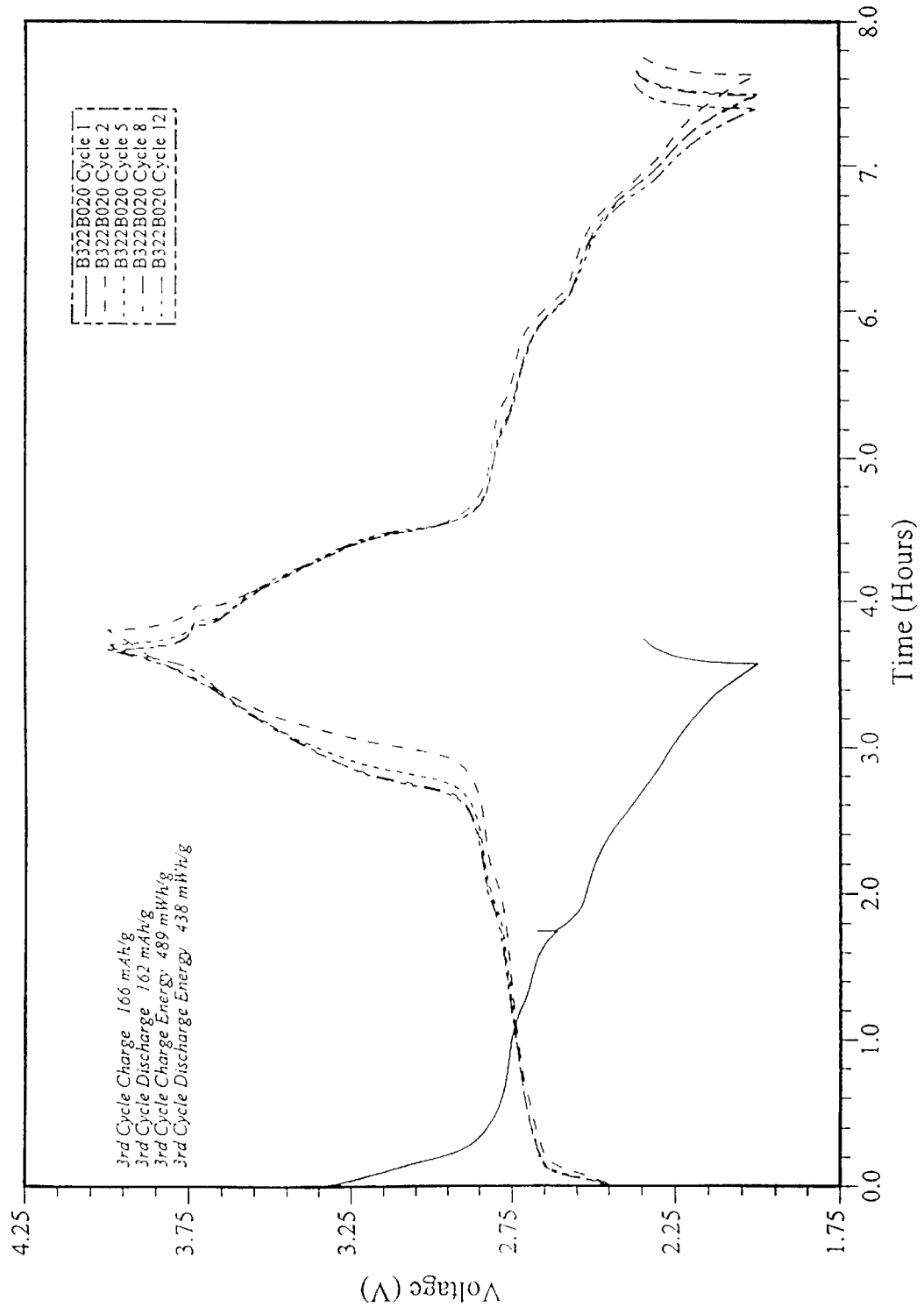
FIG. 9 shows the charge/discharge cycles for the battery of Example 7.

Test batteries were prepared as described in Example 1. Test results are shown in FIG. 9.

EXAMPLE 8
Preparation of $Li_5MnV_{11}O_{32}$

The following materials were ground in a mortar: 8.00 g $V_2O_5$ (0.044 mol), 0.93 g $Li_2MnO_3$ (0.0080 mol) and 0.89 g $Li_2CO_3$ (0.012 mol). After grinding, the mixture was transferred into an alumina crucible (Coors) and heated in air @ 600° C. overnight. After cooling, the crucible was placed in a water filled beaker and left to soak overnight. The material was scraped out of the crucible and filtered, washed with water, dried and finally reground.

Figure 10:
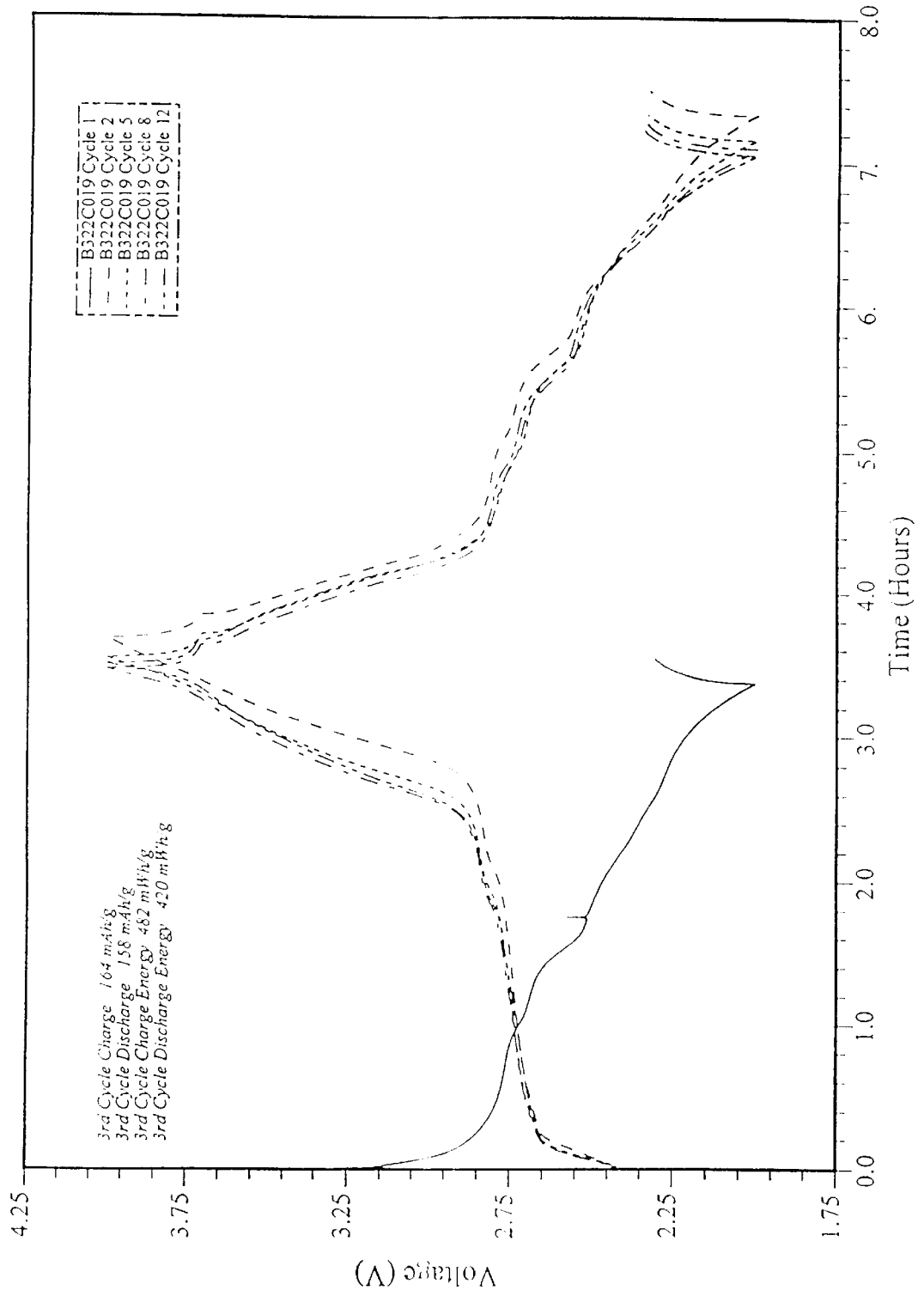
FIG. 10 shows the charge/discharge cycles for the battery of Example 8.

Test batteries were prepared as described in Example 1. Test results are shown in FIG. 10.

EXAMPLE 9

Preparation of $Li_6MnV_{12}O_{35}$

The following materials were ground in a mortar: 8.00 g $V_2O_5$(0.044 mol), 0.86 g $Li_2MnO_3$ (0.015 mol). After grinding, the mixture was transferred into an alumina crucible (Coors) and heated in air @ 600° C. overnight. After cooling, the crucible was placed in a water filled beaker and left to soak overnight. The material was scraped out of the crucible and filtered, washed with water, dried and finally reground.

Figure 11:
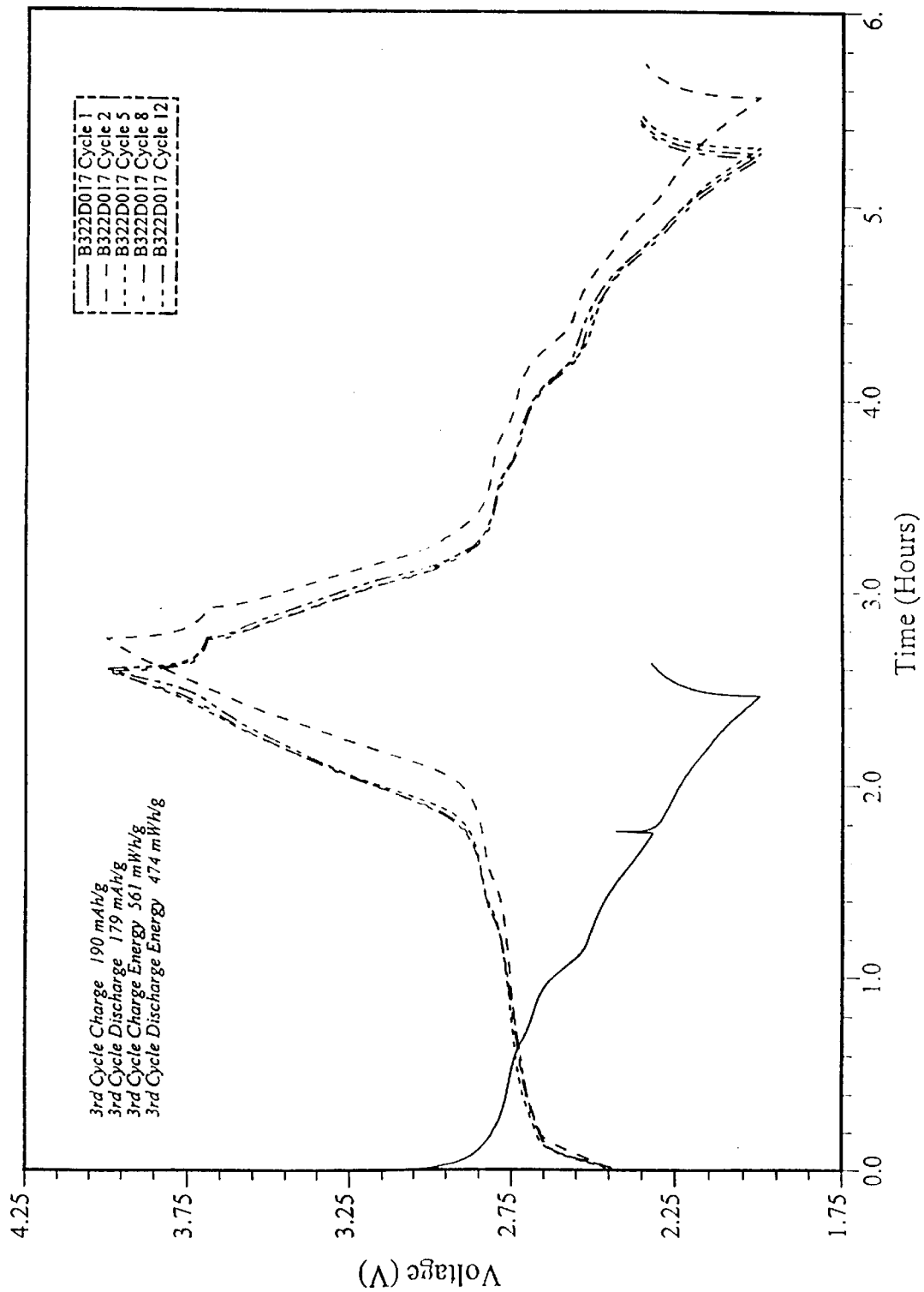
FIG. 11 shows the charge/discharge cycles for the battery of Example 9.

Test batteries were prepared as described in Example 1. Test results are shown in FIG. 11.

EXAMPLE 10

Preparation of $Li_7MnV_{13}O_{38}$

Figure 12:
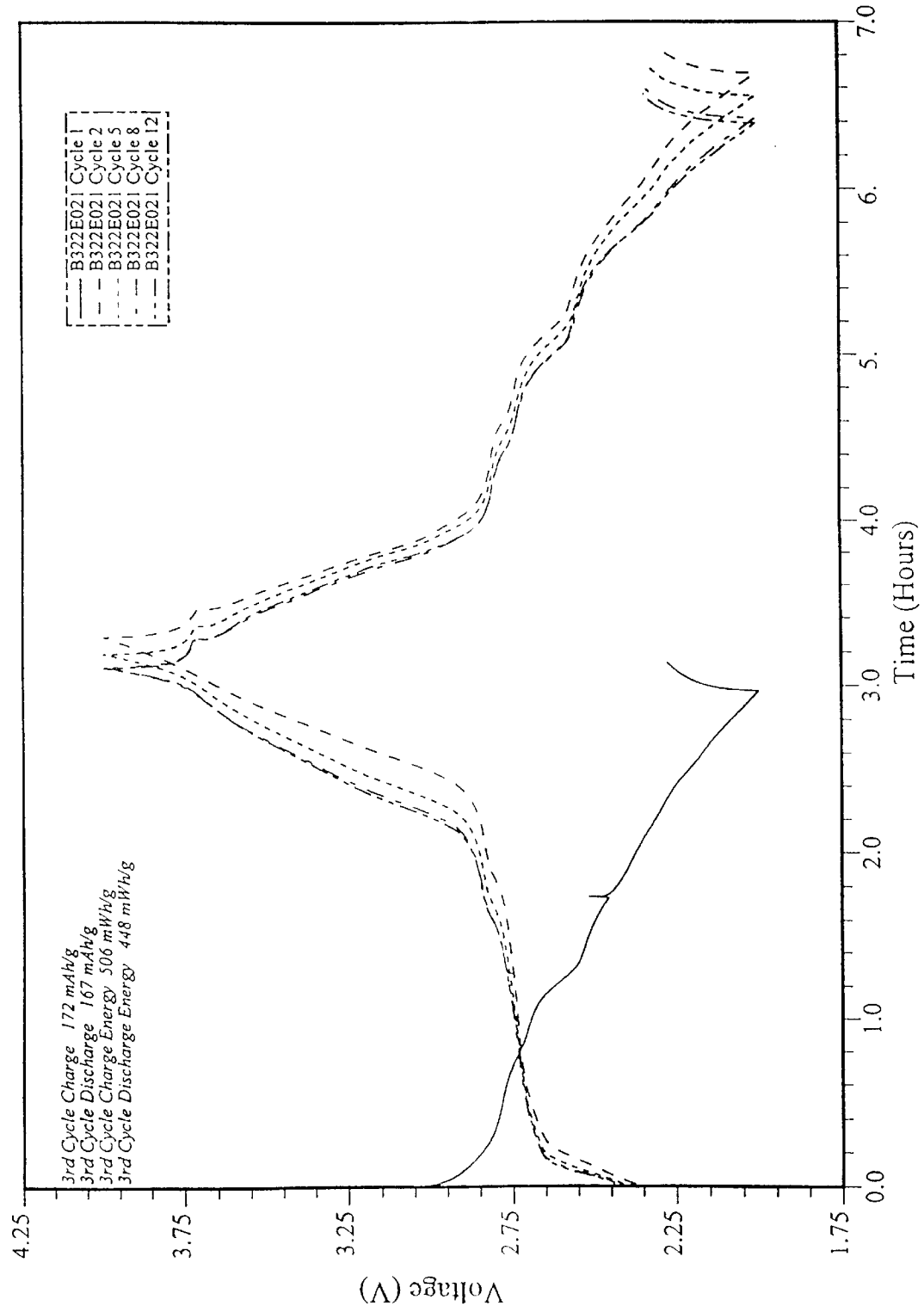
FIG. 12 shows the charge/discharge cycles for the battery of Example 10.

The following materials were ground in a mortar: 8.00 g $V_2O_5$ (0.044 mol), 0.79 g $Li_2MnO_3$ (0.0068 mol) and 1.25 g $Li_2CO_3$ (0.017 mol). After grinding, the mixture was transferred into an alumina crucible (Coors) and heated in air @ 600° C. overnight. After cooling, the crucible was placed in a water filled beaker and left to soak overnight. The material was scraped out of the crucible and filtered, washed with water, dried and finally reground. Test batteries were prepared as described in Example 1. Test results are shown in FIG. 12.

Having described the invention in detail and by reference to preferred embodiments thereof, it will be apparent that modifications and variations are possible with out departing from the scope of the invention defined in the appended claims.

What is claimed is:

1. A cathode for use in an electrochemical cell comprising a collector material having on the surface thereof a lithiated isopolyvanadate or heteropolyvanadate, wherein said isopolyvanadate or heteropolyvanadate has a cage structure.

2. The cathode of claim 1 wherein said lithiated isopolyvanadate or heteropolyvanadate is selected from the group consisting of $Li_6V_{10}O_{28} \cdot XH_2O$, $Li_7V_{13}O_{38} \cdot XH_2O$, $Li_{12}PV_{13}O_{41}$, $Li_8V_9O_{19}$, $Li_6V_{10}O_{28}$, $Li_3MnV_9O_{26}$, $Li_4MnV_{10}O_{29}$, $Li_5MnV_{11}O_{32}$, $Li_6MnV_{12}O_{35}$, $Li_7MnV_{13}O_{38}$, and mixtures thereof.

3. The cathode of claim 1 wherein said lithiated isopolyvanadate or heteropolyvanadate has a particle size of about 0.5 to 20 microns.

4. The cathode of claim 1 wherein said cathode is prepared from a cathode paste which comprises said lithiated isopolyvanadate or heteropolyvanadate, an electroconductive agent, and a polymeric binder.

5. The cathode of claim 4 wherein said electroconductive agent is carbon or graphite.

6. The cathode of claim 4 wherein said binder is selected from the group consisting of ethylene-propylene-diene terpolymer, polyvinylidene difluoride, ethylene-acrylic acid copolymer, ethylene-vinyl acetate copolymer, and a mixture of ethylene-acrylic acid and ethylene-vinyl acetate copolymers.

7. An electrochemical battery comprising an alkali metal anode;

an ionically conductive electrolyte; and a cathode, said cathode comprising a lithiated isopolyvanadate or heteropolyvanadate wherein said isopolyvanadate or heteropolyvanadate has a cage structure.

8. The battery of claim 7 wherein said lithiated isopolyvanadate or heteropolyvanadate is selected from the group consisting of $Li_6V_{10}O_{28} \cdot XH_2O$, $Li_7V_{13}O_{38} \cdot XH_2O$, $Li_{12}PV_{13}O_{41}$, $Li_8V_9O_{19}$, $Li_6V_{10}O_{28}$, $Li_3MnV_9O_{26}$, $Li_4MnV_{10}O_{29}$, $Li_5MnV_{11}O_{32}$, $Li_6MnV_{12}O_{35}$, $Li_7MnV_{13}O_{38}$, and mixtures thereof.

9. The battery of claim 8 wherein said anode is lithium, lithium-coated metal, or a lithium-metal alloy.

10. The battery of claim 7 wherein the cathode further includes an electroconductive agent and a polymeric binder.

11. The battery of claim 10 wherein said electroconductive agent is carbon or graphite.

12. The battery of claim 10 wherein said polymeric binder is selected from the group consisting of ethylene-propylene-diene terpolymer, polyvinylidene difluoride, ethylene-acrylic acid copolymer, ethylene-vinyl acetate copolymer, and a mixture of ethylene-acrylic acid and ethylene-vinyl acetate copolymers.

13. The battery of claim 7 wherein said isopolyvanadate or heteropolyvanadate has a particle size of about 0.5 to 20 microns.

14. The battery of claim 7 wherein said ionically conductive electrolyte is a polymeric material containing an alkali metal salt, said alkali metal salt interpenetrating said polymeric material.

15. The battery of claim 7 wherein said ionically conductive electrolyte is an alkali metal salt in a compatible electrolyte solvent.

16. The battery of claim 15 wherein said compatible electrolyte solvent is an aprotic solvent selected from the group consisting of dimethyl carbonate, diethyl carbonate, propylene carbonate, ethylene carbonate, methyl ethyl carbonate, gammabutyrolactone, triglyme, tetraglyme, dimethylsulfoxide, dioxolane, sulfolane, and mixtures thereof.

17. The battery of claim 15 wherein said battery comprises a separator between said anode and said cathode.

18. The battery of claim 17 wherein said separator is a non-conductive polyolefin film.

19. The battery of claim 7 wherein said cathode has an impedance of less than about 50 ohms/cm$^2$.

* * * * *